United States Patent [19]
Adams et al.

[11] Patent Number: 5,637,633
[45] Date of Patent: Jun. 10, 1997

[54] WATER-BASED CONTACT ADHESIVE FOR POROUS SURFACES

[75] Inventors: Steven E. Adams; Ian L. Churcher; Michael L. Magee, all of Richmond; Gary A. Groat, Richmonad, all of Va.

[73] Assignee: Worthen Industries, Inc., Nashua, N.H.

[21] Appl. No.: 508,953

[22] Filed: Jul. 31, 1995

[51] Int. Cl.$^6$ ................................. C08K 5/52; C08L 7/00
[52] U.S. Cl. ......................................... 524/144; 524/575.5
[58] Field of Search ................................. 524/127, 144, 524/575.5

[56] References Cited

U.S. PATENT DOCUMENTS 3,784,522  1/1974  Gray ........................... 524/144
3,840,488  10/1974  Steinwand .................. 524/144
4,097,440  6/1978  Maximovich ............... 524/144
4,111,880  9/1978  Abendroth et al. ......... 524/144

*Primary Examiner*—Tae Yoon
*Attorney, Agent, or Firm*—Samuels, Gauthier, Stevens & Reppert

[57] ABSTRACT

The addition of a chlorinated alkyl phosphate oil to a natural latex emulsion has enabled the formulation of water-based contact cements with the ability to instantly bond porous substrates together. The adhesives offer the user of solvent based contact cements an alternative more practical than hot melts, two-part water-based, or slower setting one-part water-based adhesives in industries where the immediate assembly of porous substrates is necessary.

5 Claims, No Drawings

WATER-BASED CONTACT ADHESIVE FOR POROUS SURFACES

BACKGROUND AND BRIEF SUMMARY OF THE INVENTION

Solvent based contact adhesives have long been used where the immediate bonding of two substrates is necessary to be practical for the end user. These products are characterized by their high quality bonds and the speed in which tack is developed. As a result of the very quick set speed of solvent based products, entire industries have built their manufacturing practices around the rapid assembly of parts using solvent based adhesives.

The problems with solvent based products have been well documented. Pressures to reduce emissions and health hazards of solvent based adhesives have caused end users to search for alternatives, creating new opportunities and difficulties for the adhesive formulator. However, the replacement of solvent based adhesives has been difficult to achieve. The requirement to remove the solvent from the adhesive before the final bonds will form, pushed many end users to evaluate hot melt adhesives. Some limited success has occurred replacing solvent based adhesives with hot melts, especially where non-porous substrates have been involved. Porous substrates, however, are more likely candidates for water based formulations because the residual water becomes absorbed by the substrates as the adhesive sets.

When it is realized that most end users apply their contact cements using hand-operated spray application, the difficulties of using hot melts become clear. Aside from the safety implications, spray application of hot melts requires equipment that is expensive and unwieldy compared to what the industry is used to, and the hot melt option becomes impractical. The idea that water based formulations should be easy to apply using a spray-like paint, has led end users to continue to seek water based alternatives for porous substrates.

The properties of solvent based products have been difficult to match. Rubbers used in solvent formulations provide excellent bond qualities. Substrates can be bonded together immediately upon application. The fresh bond (or green strength) is generally adequate to allow further processing (cutting, shaping, flexing, further gluing, packaging, etc.) In addition, the final bond can be formulated to have high strength, yet still be flexible. This is important where the product may experience repeated flexing, as would occur in the use of shoes and home furnishings.

Attempts to formulate water based contact cements with the ability to bond substrates immediately has centered mainly around two basic types of rubber emulsions, namely natural latex and synthetic neoprene and styrene-butadiene emulsions. Occasionally, other synthetics such as acrylics or vinyls have been used. The typical method employed to make these polymers provide immediate tack has been to add acids or acidic additives to the base polymer emulsion (s). The acid causes the stable emulsion to immediately coagulate, breaking down the protective colloid. The unprotected rubber fraction then is exposed, and is tacky. The level of tack is adjusted by the use of tackifiers, plasticizers, or other additives. As long as the adhesive is applied to both surfaces, the unprotected rubber will bond to itself as the two substrates are brought together. The final bond will form when all of the residual water has dried away.

The reaction of the acid is immediate. Therefore, the acid must be added at the point of application. For spray equipment, these products require equipment which will store the emulsion and acid catalyst separately, meter the delivery accurately and then mix the components together thoroughly at the spray head. The equipment, again, is costly and more maintenance dependent than solvent adhesive delivery equipment, thus the use of the two-part adhesive option becomes less practical. However, these products represent a significant improvement over the use of hot melts in practicality, so some success has been seen with two-part acid catalyzed products.

Of the two emulsions most widely explored (natural latex and neoprene emulsions as stated previously), natural latex has properties that has drawn adhesive formulators' attention for use in instant bonding contact cements. Aside from the fact that natural latex, over history, has been far less costly than synthetic neoprene, natural latex has the unique property to adhere quickly, termed "fast break". This is characteristic of the natural latex emulsion particle to become unstable and create tack. When compression or shear force is applied to the emulsion, the protective colloidial layer of the particle is disrupted, exposing the unprotected rubber, which will then instantly form a rubber film. This property has been used and refined in adhesives where "spotting" tack is desired. In an industry such as footwear construction, sock linings are "spot tacked" in place in the shoe by the application of finger compression against the wet adhesive. This property of fast break, and fast emulsion destabilization, has presented the adhesive formulator with an avenue to exploit in search of an adhesive with instant bonding capabilities.

The difficulty of formulating a natural latex adhesive to bond instantly is similar to that of adding acid; the end result is fluid instability. Additives which enhance the "break" of natural latex also cause the viscosity of the emulsion to rise, eventually creating gelation, rendering the adhesive unusable. For practicality, an adhesive must have enough fluid stability to be mixed, shipped, stored and used. A typical shelf life expected by adhesive users is six months. A minimum shelf life of about two months is necessary simply to allow enough time for a product to be produced, shipped and used. For this reason, a balance of fluid stability and instant tack capability is required.

It has been unexpectedly discovered that the addition of a single additive to natural latex, in an effective amount, results in an adhesive with instant tack, good green strength and enough fluid stability to allow for manufacturing, shipping, storage and use (approximate shelf life of six months). The invention comprises the use of chlorinated alkyl phosphate plasticizer oils (sold commercially as fire retardants) which provide enough instant tack to be developed, yet enough stability to be practical. It is thought that the oil associates with the natural latex emulsion, resulting in a characteristic thickening response which stabilizes after several days. Once the oil has fully incorporated itself, the latex emulsion will destabilized very rapidly and substrates can be bonded immediately.

The invention is uniquely suited for use as a contact cement for porous substrates. Because the product is fluid stable, it can be pumped from a central location through plastic piping to multiple spray guns, making the delivery system very cost effective. Through the selection of the nozzle sizes and fluid pressures, the initial tack speed of the adhesive can be maximized. This is because the partially unstable latex emulsion will rapidly destabilize as the adhesive experiences the shear force of passing through a spray nozzle. Proper spray atomization will also allow for water and ammonia to rapidly begin to evaporate, further destabilizing the adhesive. When both substrates coated with adhesive are joined, the exposed rubber will instantly bond to itself. The fresh bond, or green strength, is adequate to allow further processing or handling. Once the water fully dries, the result is a strong, flexible bond functionally similar to solvent adhesives.

In addition to spray application, the adhesive of the invention has also been extruded by nozzle. Edge turning of fabric to form bindings involves compressing the substrates and bead of adhesive together. The compression provides shear force, and the adhesive instantly forms a bond with adequate green strength to allow further handling or processing. The final bond forms once the residual water evaporates. Delivery systems for nozzle extrusion can be by pump, pressure pot, or by gravity flow.

Exemplary chlorinated alkyl phosphate oils used in the invention include tri (2-chloro isopropyl) phosphate, tri (1,3-dichloro isopropyl) phosphate, and tri (2-chloro ethyl) phosphate and blends thereof. Because these oils will provide flame retardancy and burn resistance, the invention is uniquely suited for use in automotive interiors and for home furnishings, where resistance to flame propagation is either mandated or preferred. The use of these chlorinated alkyl phosphate oils in natural latex is also thought to be unique because of the likelihood of hydrolysis, hence destruction, of these materials when exposed to water. The natural latex emulsion appears to provide a unique protection against destruction by hydrolysis and the instant tack and burn-resistance are retained throughout the shelf life of the adhesive. Further, it is believed that aromatic phosphate esters, such as triphenyl phosphate, may also provide similar properties.

DESCRIPTION OF THE PREFERRED EMBODIMENT(S)

The latex emulsion of the invention, in a preferred embodiment, is a natural latex emulsion centrifuged to 61 to 62% solids and having an ammonium hydroxide level of less than 0.8% by weight, although other types of latex may be applicable as well. This emulsion is compounded with a chlorinated alkyl phosphate oil. The phosphate oil is added directly to the latex emulsion under adequate agitation to ensure a rapid incorporation. It has unexpectedly been discovered that adding a particular class of chlorinated alkyl phosphate oils into the latex emulsion, in addition to providing the instant tack and green strength, also displays unique stability properties to the formulation.

EXAMPLE

At ambient temperature, the chlorinated phosphate oils are blended with the centrifuged natural latex emulsion (having an ammonia content of less than 0.3% by weight). Occasionally, slight amounts of pigment are added for color to enable spraying operators to see the amount applied.

An adhesive of the preferred embodiment of the invention has the following composition:

| % by weight | Component |
| --- | --- |
| 95% | Natural latex emulsion (centrifuged to 61–62% solids, ammonia content less than 0.3%) |
| 5% | Chlorinated alkyl phosphate oil blends |

Natural Latex Emulsion
Supplier: Ennar Latex, Inc., Middlebury, Conn.

Product Designation: NC-407
Product Description: natural rubber emulsion (polyisoprene) concentrated to 61–62% solids by centrifugation. An ammonia content of less than 0.3% on total weight of latex.

Chlorinated Alkyl Phosphate Oils
Supplier: Akzo Chemicals Inc., Chicago, Ill.
Product Designation: Fyrol FR-2 and Fyrol PCF
Product Description: Fyrol FR-2 is a tri (1,3-dichloro isopropyl) phosphate. Fyrol PCF is a tri (2-chloro isopropyl) phosphate. The blend of the above two oils is FR-2 25% and PCF 75% to achieve a specific gravity of 1.329–1.333 at 25° C.

The effective amount of chlorinated phosphate oils can vary between 1 to 12% by weight.

The contact adhesive of the Example is applied by spraying through a nozzle, such as an 0.070 inch diameter nozzle, under a liquid pressure of 15–80 psi. The adhesive remains tacky for up to 120 seconds. Depending upon the specific end use of the adhesive, the basic formulation can be varied resulting in a longer or shorter tack life and a greater or less tack strength.

The basic formulation is a water-based emulsion of natural (rubber) and a chlorinated alkyl phosphate oil. This one-part formulation unexpectedly provides superior instant tack (fast grab) coupled with excellent green strength. The term "fast grab" means that the adhered pieces can be moved or handled within a few seconds after they are joined without dislodging from one another. Typically, the joined pieces are moved to a storage area or the next workstation for further processing. For most surfaces, the one-part formulation of the invention provides a green strength which is adequate until the adhesive sets. For purposes of this disclosure, the term "green strength" means that the pieces are adhered sufficiently such that further processing steps can be performed without the pieces dislodging from one another; for example, final packaging, further cutting or shaping, attachment to other pieces, etc.

As is understood in the art, most aqueous natural latex emulsions must be protected from freezing. Most have a limited shelf life, typically six months to one year. Obviously this is dependent upon the specific product. Mechanical stability of the formulated adhesive is necessary in order for both to survive shipping and processing. Shear forces will be encountered during mixing and pumping and where coating applications are envisioned at the nips of rollers during coating. Lastly, the end use of the adhesive will vary. Therefore, as optional additives to the basic inventive formulation, certain additives can be used either alone or in various combinations to ensure the properties of shelf life, stability and performance subsequent to application.

Usually, with natural latex based adhesive emulsions, tackifier resins are used to control set speed, green tack and final bond properties. There are two major classes of tackifier resins typically used. They are the rosin derivatives and the hydrocarbon resins.

Surfactants are used to control viscosity, stability and rheological characteristics (roll coating, spraying or extrusion) and can be used to further modify the invention formulations to fit a variety of applications, methods and end uses.

The use of the foregoing additives are well within the skill of the art.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A partially destabilized water-based contact adhesive which consists of:
   a centrifuged natural rubber aqueous emulsion; and
   a chlorinated phosphate oil in an amount of 1%–12% by weight based on the total weight of the adhesive, the adhesive characterized by fast grab and green strength.

2. The adhesive of claim 1 wherein the rubber emulsion is a natural latex.

3. The adhesive of claim 2 wherein the natural latex emulsion comprises an effective amount of ammonium hydroxide of less than 0.8% by weight.

4. The adhesive of claims 1, 2 or 3 wherein the chlorinated phosphate oil is selected from the group consisting of tri (2-chloro isopropyl) phosphate, tri (1,3-dichloro isopropyl) phosphate, and tri (2-chloro ethyl) phosphate.

5. The adhesive of claim 1 wherein the percent solids is between 61%–62% in said emulsion.

* * * * *